United States Patent

Martens

[15] 3,636,935
[45] Jan. 25, 1972

[54] VEHICLE ENGINE LIQUID CIRCULATING SYSTEM

[72] Inventor: David A. Martens, Washington, Mich.

[73] Assignee: General Motors Corporation, Detroit, Mich.

[22] Filed: Apr. 9, 1970

[21] Appl. No.: 26,832

[52] U.S. Cl..................123/122 AB, 123/41.1, 123/41.29, 237/12.3 B
[51] Int. Cl......................................F02m 31/10, B60h 1/04
[58] Field of Search ........123/122, 122 A, 122 AA, 122 AB, 123/41.1, 41.29; 237/12.3 B

[56] References Cited

UNITED STATES PATENTS

| | | | |
|---|---|---|---|
| 2,807,245 | 9/1957 | Unger | 123/41.1 |
| 3,150,652 | 9/1964 | Hollabaugh | 123/122 A |
| 1,110,724 | 9/1914 | Stewart | 123/122 A |
| 2,227,927 | 1/1941 | Downs | 123/41.1 UX |
| 1,145,995 | 7/1915 | Johnson | 123/122 A X |
| 2,716,399 | 8/1955 | Rothwell | 123/122 A |
| 2,936,746 | 5/1960 | Rundquist | 123/122 A |
| 2,949,103 | 8/1960 | Carlton | 123/122 A |
| 2,236,889 | 4/1941 | Booth | 123/41.1 UX |
| 2,300,841 | 11/1942 | Raney | 237/12.3 B |
| 3,302,696 | 2/1967 | Rogers | 237/12.3 B UX |

Primary Examiner—Al Lawrence Smith
Attorney—J. L. Carpenter and Robert J. Outland

[57] ABSTRACT

A vehicle engine includes a cooling system having a main flow path through the engine coolant passages to the vehicle radiator and back to the engine water pump for return to the coolant passages. A parallel flow path exists from the coolant passages through the engine intake manifold for heating the intake mixture and thence through the vehicle heater core and back to the water pump inlet. A thermostatic valve in the main flow path to the radiator controls the coolant temperature by opening or completely shutting off flow to the radiator as necessary. Bypass flow through the manifold and heater core is continuous so that engine coolant heat is available to the manifold and vehicle heater as soon as possible after engine starting.

1 Claims, 3 Drawing Figures

PATENTED JAN 25 1972  3,636,935

INVENTOR.
David A. Martens
BY
Robert J. Outland
ATTORNEY

VEHICLE ENGINE LIQUID CIRCULATING SYSTEM

FIELD OF THE INVENTION

This invention relates to vehicle engine cooling systems and, more particularly, to a system in which continuous by pass flow is provided through the engine intake manifold for heating the incoming mixture and through the vehicle heater core for use in heating the interior of the vehicle.

SUMMARY OF THE INVENTION

The present invention provides a liquid circulating system for a vehicle engine having means for providing heat to the intake mixture in the manifold and to the vehicle heater core with fast warmup of the coolant after starting and temperature control during operation.

The arrangement includes a main coolant flow path from the engine water pump through the internal cooling passages of the engine and out past a thermostatic valve to a main flow path through the vehicle radiator and back to the water pump. A second flow path bypassing the thermostat and radiator exists from the engine internal coolant passages through the engine intake manifold and then through the vehicle heater core, returning from there to the water pump inlet.

The thermostat is arranged to completely shutoff flow to the radiator when the coolant is below the desired operating temperature so that upon starting, all engine heat is directed only through the inlet manifold and vehicle heater core until the proper coolant temperature is reached. In this way, fast warmup is assured and the demands of intake mixture heating and vehicle occupant comfort are met as promptly as possible after engine starting.

These and other advantages of the invention will be more clearly understood from the following description of a preferred embodiment, taken together with the accompanying drawings.

DESCRIPTION OF THE PREFERRED EMBODIMENT

Figure 1:
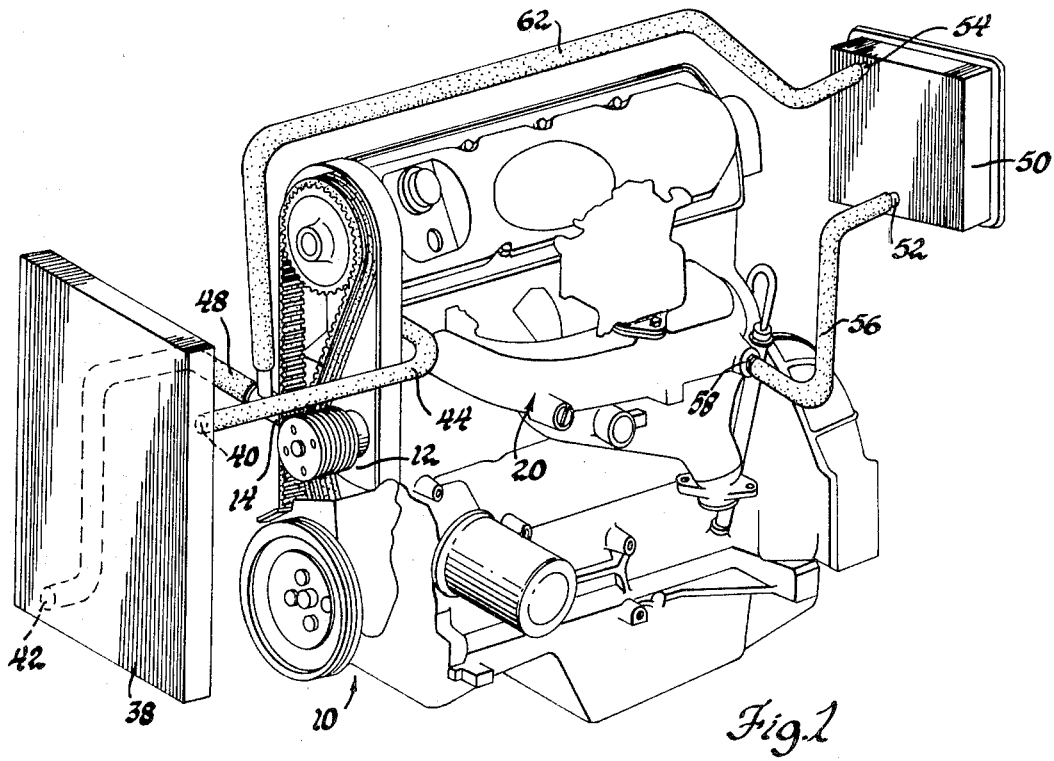
FIG. 1 is a pictorial view showing, in part schematically, a vehicle engine and external portions of its liquid circulating system which are formed in accordance with the invention.
Figure 2:
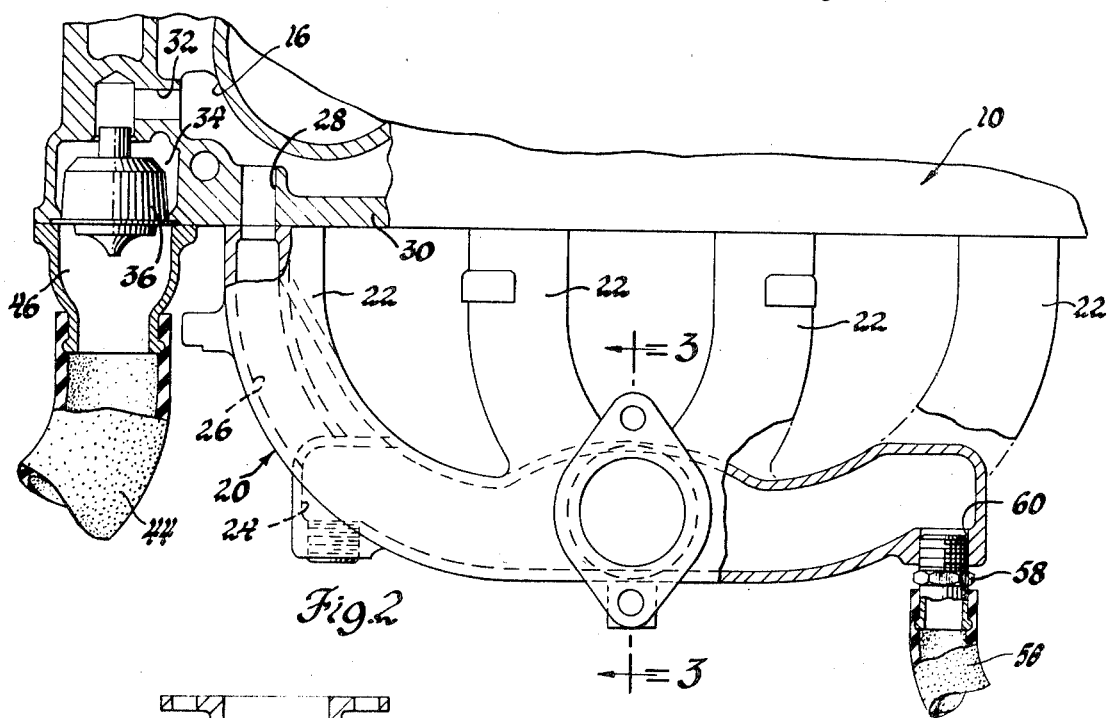
FIG. 2 is a cross-sectional view illustrating portions of the cooling liquid flow path through the engine, thermostat and inlet manifold.
Figure 3:
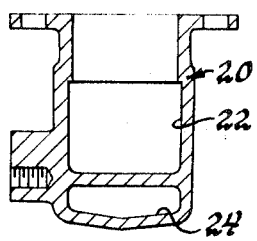
FIG. 3 is a cross-sectional view of a portion of the inlet manifold taken generally in the plane indicated by the line 3—3 of FIG. 2.

Referring now to the drawings in further detail, numeral 10 generally indicates an internal combustion engine as applied to a vehicle (not shown). Engine 10 includes a water pump 12 having an intake portion 14 and arranged to deliver cooling liquid into internal coolant passages 16 of the engine for cooling the combustion heated surfaces. Water pump 12 is driven by the engine crankshaft through a belt 18. The construction and manner of driving the water pump is described in the copending U.S. Pat. application Ser. No. 25,229 filed Apr. 2, 1970 in the name of B. J. Mitchell, which is assigned to the assignee of the present application and the disclosure of which is hereby incorporated herein by reference.

Engine 10 mounts an intake manifold 20, which includes distribution passages 22 through which combustible mixture is delivered to the engine cylinders. The intake manifold also includes a heat chamber or passage 24 extending beneath the mixture distribution passages 22 and in heat exchange relation therewith. Chamber 24 connects through an inlet passage 26 and an outlet opening 28 in the cylinder head portion 30 of the engine casing with the internal coolant passages 16 within the engine. A second outlet opening 32 from passages 16 connects with a recess 34 in the cylinder head in which is mounted a thermostatic valve 36 for a purpose to be subsequently described.

The vehicle-mounted engine cooling or liquid circulating system includes a radiator 38 having an inlet 40 and an outlet 42. The radiator inlet 40 is connected through a hose 44 with an outlet fitting 46 mounted on the cylinder head over the thermostat receiving recess 34. The radiator outlet 42 is connected through another hose 48 with the inlet portion 14 of the water pump 12.

The liquid circulating system further includes a heater having a heat exchanger core 50 including an inlet 52 and an outlet 54. The heater includes conventional means (not shown) for passing air through the core to be heated, and delivering the heated air to the interior of the vehicle for warming the occupants thereof. The inlet 52 of core 50 is connected through a hose 56 and connector fitting 58 with an outlet 60 opening from the intake manifold coolant chamber 24 at the opposite end from inlet passage 26. The heater core outlet 54 is connected through another hose 62 with the water pump intake portion 14.

In operation, thermostat 36 controls the coolant flow to radiator 38 and is normally closed to prevent such flow whenever the coolant temperature is below the predetermined thermostat setting. Accordingly, upon starting a cold engine, the rotation of the water pump forces coolant through the internal coolant passages 16 and out through opening 28 to the manifold heat chamber 24, from whence it passes through the heater core 50 and back to the pump inlet 14. Flow continues to be exclusively through this circuit until the engine warms up to the desired coolant operating temperature so that a fast warmup is provided with all the heat absorbed by the coolant being available to warm the intake mixture in the manifold 20 and to warm the air delivered to the vehicle interior.

When the desired coolant temperature is reached, the thermostat 36 opens, permitting a controlled amount of flow to pass through hose 44 to radiator 38, where heat is rejected from the coolant in a conventional manner. The coolant is then returned through hose 48 to the inlet 14 of the water pump, by which it is again circulated through the coolant passages 16.

While the invention has been described by reference to a preferred embodiment chosen for purposes of illustration, it is obvious that numerous modifications could be made within the scope of the inventive concepts disclosed and the invention is, accordingly, to be limited only by the language of the following claims.

1. For use in an automotive vehicle having an internal combustion engine, a liquid circulating system comprising
    internal coolant passages in said engine and having first and second outlets,
    a coolant pump having an inlet and arranged on said engine to deliver liquid engine coolant to said internal passages,
    an inlet manifold mounted on said engine and having passages for distributing combustible mixture to the engine cylinders, said inlet manifold having a chamber formed therein in heat exchange relation to the manifold passages, said chamber having an inlet at one end connected internally of said manifold with said first engine coolant passage outlet and said chamber having an outlet at the other end from said inlet,
    a vehicle-mounted heater core having an inlet and an outlet, said heater core inlet being connected to the manifold chamber outlet and said heater core outlet being connected to the coolant pump inlet,
    a vehicle mounted radiator having an inlet and an outlet, said radiator inlet being connected to said second engine coolant passage outlet and said radiator outlet being connected to the coolant pump inlet and
    a thermostatic valve in said engine and adapted to control coolant flow from said second engine coolant passage outlet, said thermostatic valve being completely closed at temperatures below a predetermined value to prevent coolant flow through said radiator and opening in response to temperatures above said predetermined value to permit a controlled flow of coolant through said radiator, whereby, under all engine operating conditions, engine coolant is forced by said pump through said engine internal coolant passages and through said intake manifold chamber and said vehicle heater core and engine coolant is additionally forced through said radiator only when the temperature of the coolant is above said predetermined value.

* * * * *